United States Patent [19]

Calderon

[11] Patent Number: 4,464,197
[45] Date of Patent: Aug. 7, 1984

[54] METHOD FOR MAKING IRON BY INDUCTION HEATING

[76] Inventor: Albert Calderon, 1065 Melrose St., Bowling Green, Ohio 43402

[21] Appl. No.: 131,137

[22] Filed: Mar. 17, 1980

[51] Int. Cl.³ .............................................. C21B 13/12
[52] U.S. Cl. .......................................... 75/11; 75/37; 75/13
[58] Field of Search .......................... 75/37, 11, 12, 13; 373/151

[56] References Cited

U.S. PATENT DOCUMENTS

| | | | |
|---|---|---|---|
| 1,759,173 | 5/1930 | Smith | 75/37 |
| 2,509,921 | 5/1950 | Gwynn | 373/151 |
| 2,704,662 | 3/1955 | Kocks | 75/11 |
| 2,786,747 | 3/1957 | Gallusser | 75/11 |
| 3,948,640 | 4/1976 | Elvander et al. | 75/11 |

Primary Examiner—M. J. Andrews
Attorney, Agent, or Firm—Maky, Renner, Otto & Boisselle

[57] ABSTRACT

An improved method and apparatus for making metallic iron from iron ore including low-grade ore by the use of a solid reductant such as coal in a completely enclosed system wherein the heat for reduction originates from induction coils surrounding a vertical retort, said retort possesses compartments made of steel walls, which walls are heated by induction. The charge material made up of ore and coal are pre-mixed and charged into said compartments at the top of the retort and the iron ore is reduced while descending within said compartments so that when the charged materials reach the bottom of said compartments, the iron ore is metallized to elemental iron. A discharge means removes sections of the metallized iron from said shaft at a temperature of around 1,800° and is fed into a mixer for liquification, desulfurization, and deganguing. The molten iron from the mixer is tapped into a ladle and is of high-quality iron equal in quality to blast furnace iron and suitable for charging directly into a steel making furnace. The slag material in the mixer is periodically removed from the mixer for disposal. In instances where the iron cannot be used in a molten state, it is passed through a pigging machine where it is solidified into pigs for subsequent use as a solid charge.

28 Claims, 16 Drawing Figures

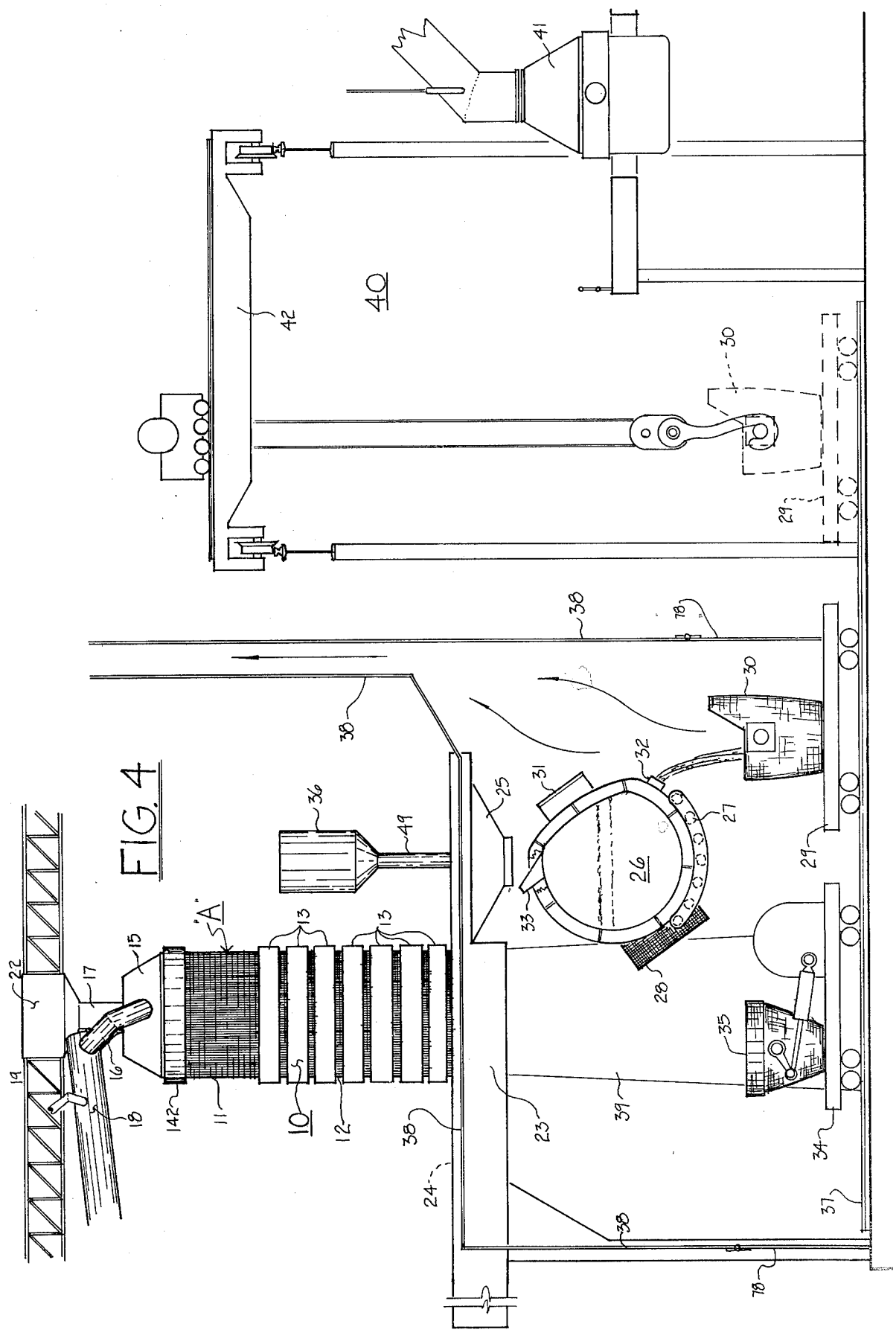

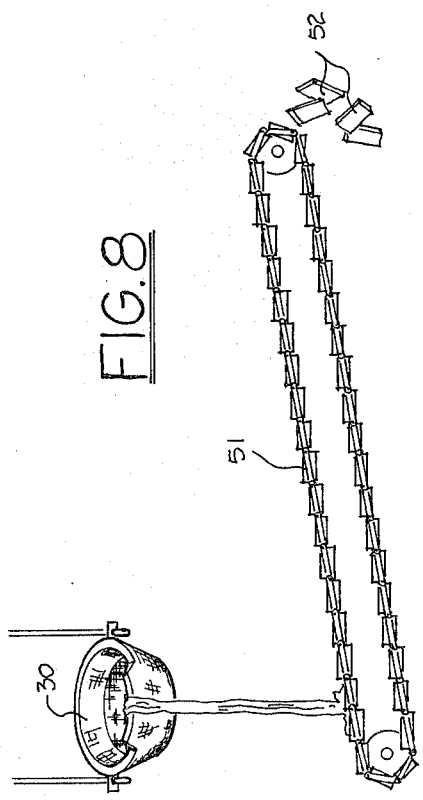
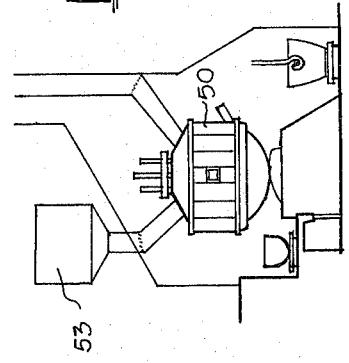
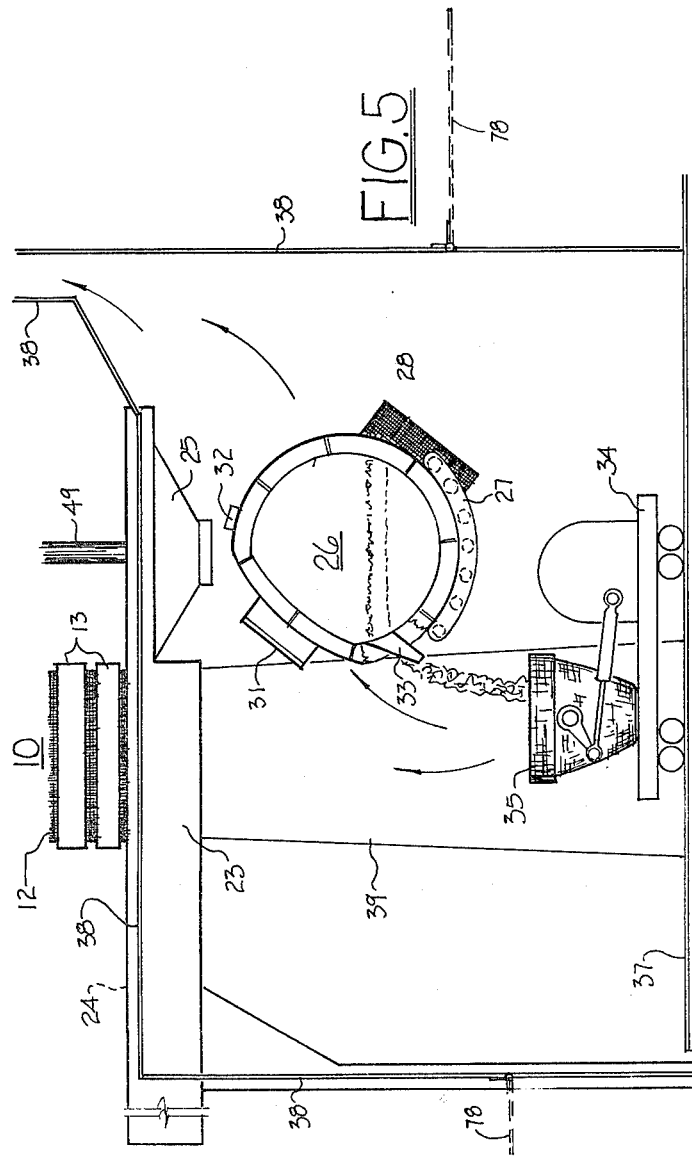
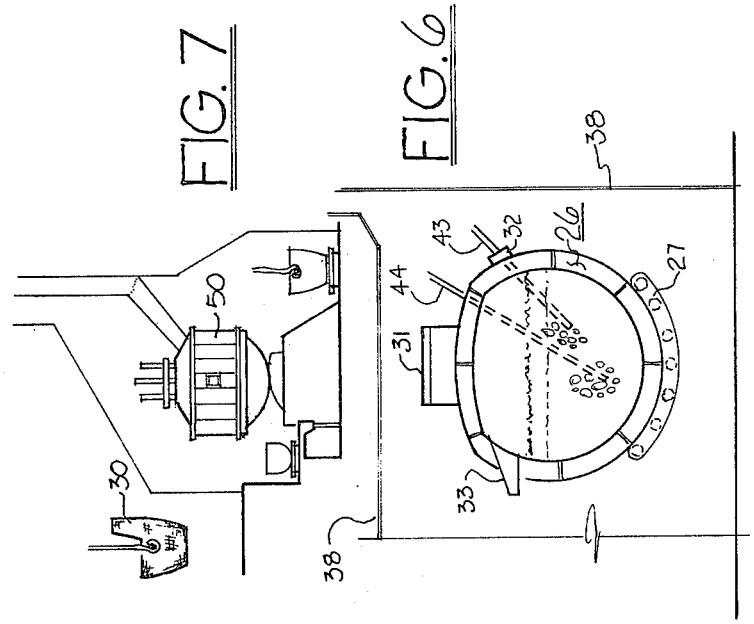

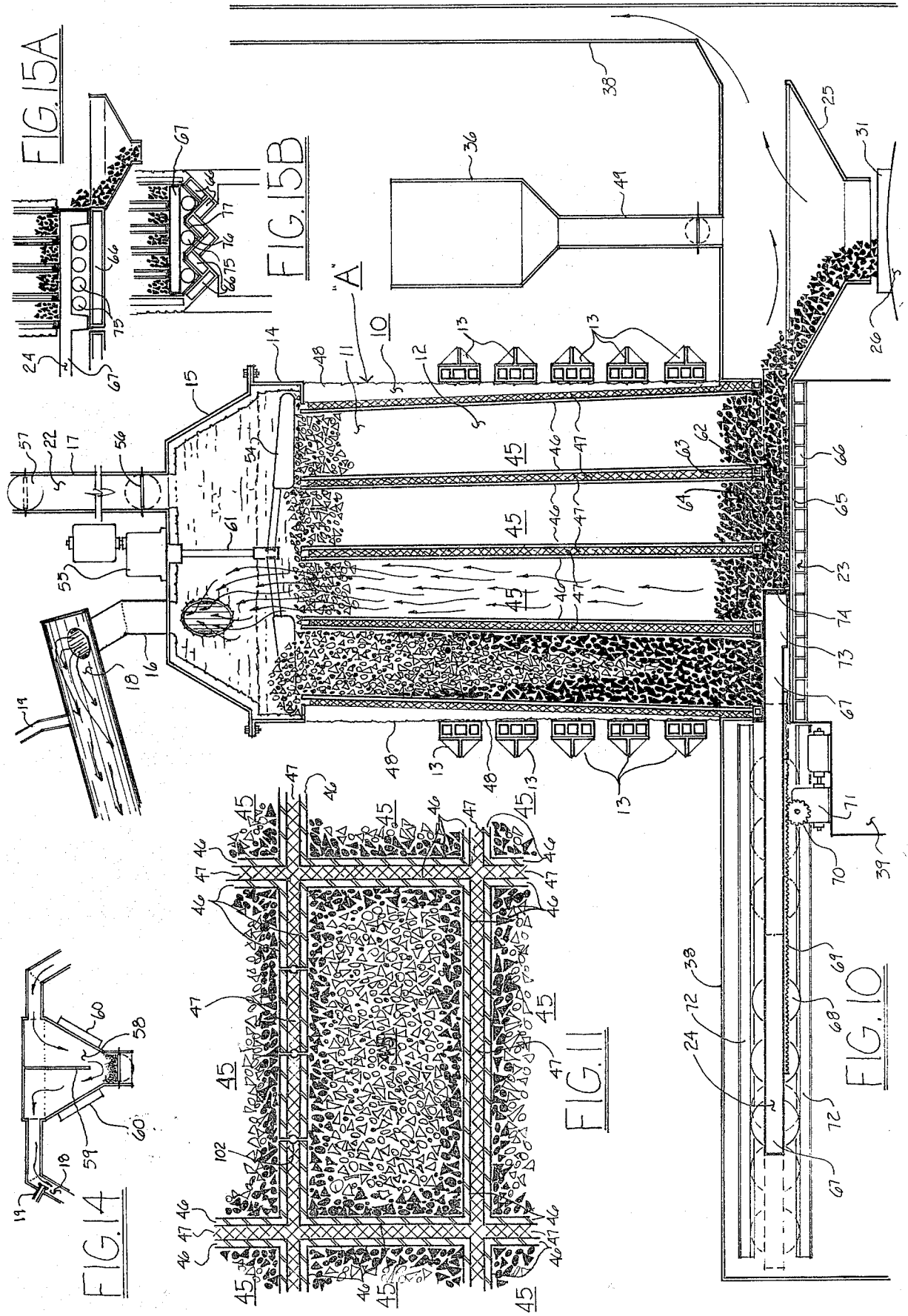

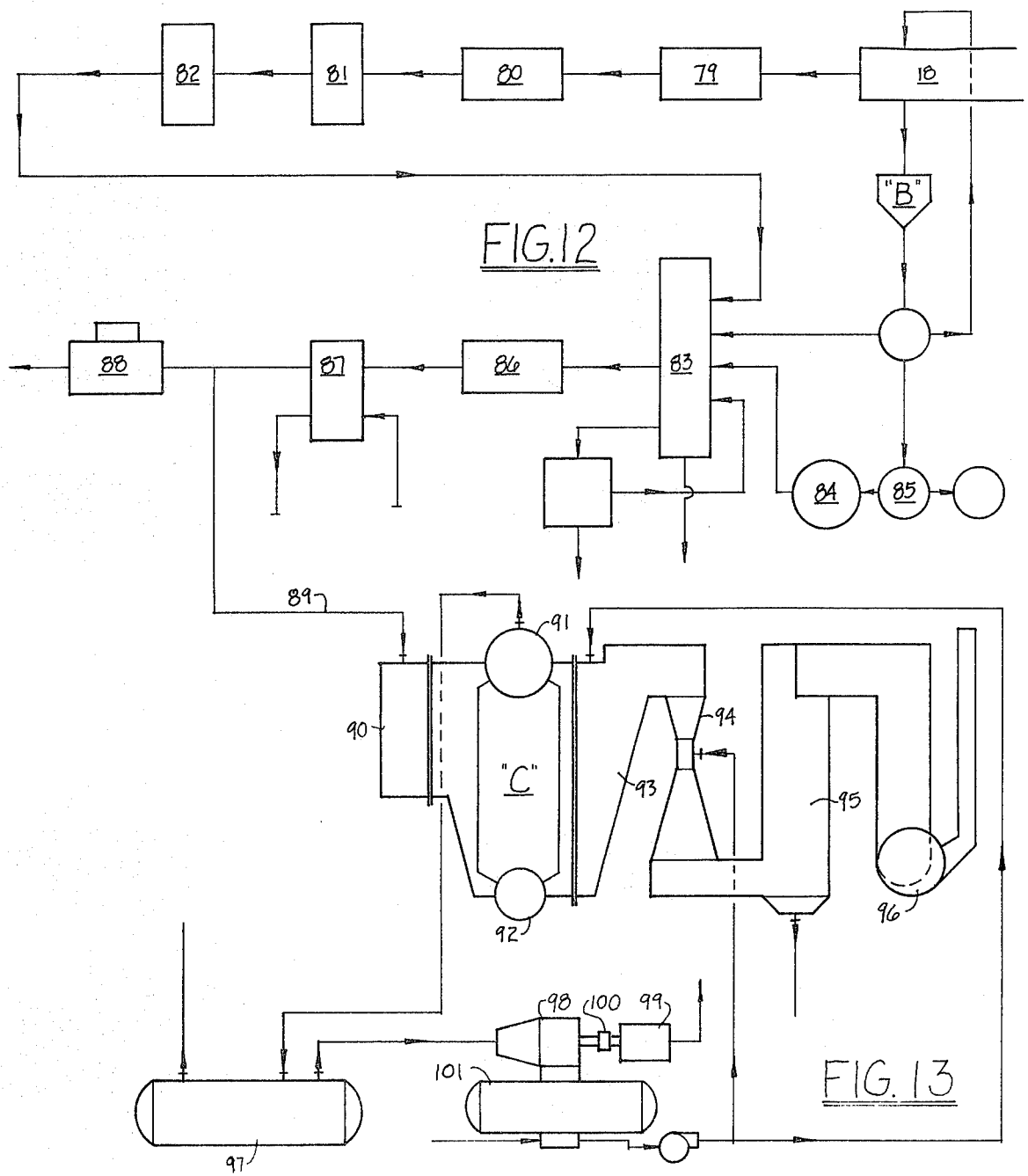

METHOD FOR MAKING IRON BY INDUCTION HEATING

The present invention relates to an improved method and apparatus for making iron and preferably molten iron for direct charging into steel making furnaces such as a basic oxygen furnace (BOF), or an electric furnace. This invention is an improvement over known direct reduction processes but in particular over U.S. Pat. No. 4,082,543, issued to Beggs, et. al. on Apr. 4, 1978 and the Swedish process described in the publication "Ironmaking and Steelmaking", 1979, No. 5, titled "The Boliden Inred Process", authored by Elvander, et. al.

1. NEW TECHNOLOGY REQUIRED FOR IRONMAKING

Cokemaking in the United States is in decline, and since the making of iron in blast furnaces is dependent on coke, the steel industry in the United States is in serious trouble. In 1979, 500 million dollars of coke was imported into the United States. In future years, the import of coke will increase greatly if it is available from foreign sources. These are the conclusions of a report submitted to the Federal Government by William T. Hogan, S. J. and Frank T. Koelble of the Industrial Economics Research Institute of Fordham University.

The present design of coke ovens cannot comply with the emission requirements of the Clean Air Act nor with the standards of OSHA. Sixty percent of the batteries in the United States require rehabilitation from the pad up. Rebuilding has become so expensive that the operators refuse to do so when the rebuilt batteries will still not comply with the standards of EPA or OSHA. Even new batteries of the same design costing over 180 million dollars (1980 dollars) will not fully comply with those standards. Coke oven batteries, as we have known them, are therefore unable to solve the crisis in cokemaking but rather exacerbate that crisis. They must be eliminated in order to solve the emissions and health hazard problems.

Most blast furnaces in the United States are small and cannot be competitive with larger foreign installations. The cost of large blast furnaces far exceeds the financial ability of most steel companies. Rehabilitation of small furnaces will not make them competitive. In view of this, steel companies are closing down facilities that depend on old coke ovens and small blast furnaces causing a crisis in the steel districts. It is therefore necessary to find a practical method for making iron that avoids the use of coke ovens and blast furnaces and also permits the use of less expensive coals.

2. THE INSTANT INVENTION WILL SOLVE BOTH COKE AND BLAST FURNACE PROBLEMS

The instant invention which uses a retort and which is charged with coal and iron ore utilizes induction heating to cause the necessary reactions and reductions, the coal may be in the form of metallurgical or non-metallurgical, with low sulfur or high sulfur, and ore may be in the form of powder, lumps, or pellets. The induction heating arrangement is an amplification of that shown by FIG. 5, in the Applicant's co-pending application mailed on June 28, 1978, bearing Ser. No. 921,760 and having a filing date of July 3, 1978, now abandoned. Said FIG. 5 shows the formation of compartments within a shaft or a retort for efficiency of heating.

The product of the retort consists of about 93% Fe and 5% carbon. It leaves the retort in a non-molten state with a temperature of about 1,800° F., and is fed directly into a mixer which is also equipped with an induction coil for melting and stirring in order to remove the sulfur and gangue material after it becomes molten in the mixer. Fluxes may be added to the retort or to the mixer for slag formation. The molten iron is then charged directly into a steelmaking furnace such as basic oxygen furnace (BOF), electric arc furnace, etc.

3. BRIEF DESCRIPTION OF RETORT, AND MIXER, AND BY-PRODUCT PLANT

(a) Retort

The retort is a completely enclosed shaft or tower measuring about 90 feet in height and generally comprising the following sections:

(i) Overhead ductwork for delivery of the charge materials in a sealed manner and the removal of the gas to a by-product plant.

(ii) Distribution hopper for the uniform and continuous charging of the materials (iii) Pre-heating zone for drying the charge and recovering heat energy from the rising gases.

(iv) Heating zone for destructive distillation of the coal and direct reduction of the ore.

(v) Discharge section for the ejection of the metallized iron while hot (about 1,800° F.) from the tower.

(vi) Delivery chute from the discharge to deganguing and desulfuring mixer.

(vii) Sealed enclosure to collect emissions.

Section (iv) the heating zone, is the continuation of section (iii) the pre-heating zone except for induction coils that surround the heating zone. Both sections (iii) and (iv) are made up of compartments made of steel or iron walls, such as webs, and preferably each compartment having a rectangular shape to form a plurality of cavities of such suitable size as to give maximum efficiency and uniformity in heating and at the same time large enough to provide room to accept the charge material without interference to cause the smooth descent of the charge within said retort. Approximate dimensions of each cavity are about 2 feet by 4 feet. Each cavity is insulated from the other by an insulating material such as Fibrefrax. By way of example, there are about 48 cavities to produce roughly a million tons of metallized iron per year. Preferably each cavity is slightly tapered divergently downwardly to be free of obstructions from the hopper, section (ii) at the top, to discharge section (v) which is beneath heating zone, section (iv).

The retort uses induction heating in the absence of air to effect the necessary chemical reactions, with the heat uniformly introduced and unlike the references cited. It is conceivable to introduce some of the gas generated back into the retort through the walls of said compartments. There is no burning of coal by external oxygen nor burning of the by-products within the furnace as taught by "Boliden Inred". Both U.S. Pat. No. 4,082,543, and paper of "Boliden" are identified hereinbefore. These are some of the distinctions between the instant invention and the references cited.

Roughly, the top ten feet of the retort compartments comprises the pre-heating zone. Beneath this zone, about 30' of the retort is the heating zone which is equipped with a plurality of induction coils which completely surround the heating zone of the retort. The pre-heating and heating sections of the retort are made up of said continuous vertical compartments or cavities having steel or iron walls to form a multi-cavity structure. The walls of these cavities are heated by induction in order to insure uniform and efficient heating through the entire tower, both longitudinally and transversely without short-circuiting which is also known as "rat-holing". In this manner, the heated walls uniformly heat the charge as the charge descends in the retort. As the degree of metallization increases, the charge closest to the heated walls heats up not only by conduction but also by induction.

Above the pre-heating sections of the tower, there is a distribution hopper. A positive agitator is mounted within the distribution hopper to guarantee that all the compartments are supplied with the charge. Ducts for taking away the gas to the by-product plant are mounted above the distribution hopper; the raw gas is immediately flushed after it leaves the retort in order to condense the heavy tars. A chute with a prefered structure of a double valve arrangement is mounted to the top of the distribution hopper. This arrangement prevents the escape of gas during charging.

Secondary induction heating may be used at the distribution hopper to insure that no tar deposits occur in the hopper itself, on the ducts leading from the hopper to the flushing point nor on the chute which feeds the coal to the distribution hopper.

Beneath the lowest induction coil of the tower, a water-cooled bed supports the complete charge contained within the retort. An ejector ram equipped with a carbide blade is mounted to travel transversely to eject hot metallized iron from the bottom of the tower and push it into a receiving mixer. Intermediate water-cooled carbide blades are mounted at the bottom of each row of cavities transversely to the direction of travel of said ram.

(b) Mixer for Liquification, Desulfurization, and Deganguing

This vessel simulating a hot-metal mixer, and hereinafter referred to as "LDD" for brevity, is equipped with an induction coil between its rockers. The induction coil elevates the temperature of the metallized charge received from the retort from about 1,800° F. to about 2,500° F. by induction in order to melt it while at the same time providing a mixing action for desulfurization and also providing a uniform temperature of the molten iron in the LDD. The fluxes added to the LDD are common fluxing agents such as lime, magnesium, and soda. Beneath the LDD, two transfers are furnished, one for a ladle for hot metal and the other for slag pots for the ash, gangue, and fluxing agents, jointly called "slag". A delivery chute interconnects the retort to the LDD while the entire lower structure of the retort and the entire LDD is encased in an envelope in the form of a "dog house" which is tied to a dust collection system in order to control emissions.

(c) By-Products and Gases

The instant invention gathers the raw gases from the top of said retort at about 1,000° F. in order to prevent tar deposits. The gases leaving the retort are immediately flushed with a liquor to condense the tars and heavy oils and to treat the gases in the by-product plant in order to recover the valuable by-products as well as the rich gas. It is important not to overheat the gases at the top of the retort in order to prevent the cracking of methane generated during the destructive distillation of the coal. The instant invention does not contemplate to introduce the recovered gases back into the retort. This is so, in order to prevent the injection of gases at high pressure into the retort, since such gases leaving the charge at the top of the retort will carry with them an excessive amount of particulates of coal and ore and cause serious problems in the by-product plant and also reduce the value of the by-products collected. A detailed description of the gas evolution, heat recovery, and gas produced will be described later in this specification. Both references cited above will carry a great deal of particulates with the gases leaving the shaft or furnace.

This invention has for its main object, the elimination of the coke ovens and the blast furnaces and instead the substitution of a method and apparatus that is dependable to operate, highly productive, and requiring a small fraction of the investment currently needed for conventional equipment of comparable capacity.

Another object of this invention is the provision of a method and apparatus that is capable of satisfying the great demands for molten desulfurized iron of consistent temperature and analysis, by the most efficient method of making steel; namely, the basic oxygen furnace, which furnace is the back bone of steel production in the United States as well as the world.

Further, an object of the instant invention is to recover the by-products and gases and to treat them. The by-products are valuable feed stocks and the gases possess such amounts of energy which exceed the energy required for the power generation for the induction coils of said retort. The collection of the raw gases to be accomplished with no consequential carry-over of particulates.

Yet, an object of this invention is the provision of dependable equipment without complexities to insure day-to-day operation to guarantee the results that are absolutely necessary to maintain the viability of steel-making operations.

Therefore, an object of the instant invention is to eliminate all pollution and OSHA problems by providing a completely enclosed method and apparatus to make iron of blast furnace quality which heretofore has not been possible.

Further yet, an object of the instant invention is to provide a method and apparatus capable of using all grades of ore and coke including powdered ore, lump ore, and pellets, as well as various grades of coals including low-sulfur as well as high-sulfur coals, including materials directly from the mine, which materials are in abundance within the boundaries of the United States.

Further, another object of the instant invention is to provide a method of making iron that is non-critical in its function in order to produce dependably and consistently day in and day out.

Yet another object of the instant invention is to provide a method and apparatus that is efficient in energy use and a positive producer of energy to result in a net gain and make the invention attractive from the standpoint of economics.

Therefore, another object of the instant invention is to provide a process that is continuous to eliminate fluctuations inherent in batch-type systems.

Further yet, another object of the instant invention is the provision of equipment that lends itself to rugged construction to minimize maintenance.

Further, therefore, another object of the instant invention is to provide a method and apparatus that would efficiently distribute the heat in order to guarantee a uniform product with a minimum consumption of energy.

Therefore, yet an object of the instant invention is to provide control means to insure proper heating and to prevent material from fusing or melting; said control means being compatible for programming and computerization to result in a product at the lowest cost using the minimum manpower.

Therefore, yet, another object of the instant invention is to provide a method and apparatus that requires no magnetic separation of the product nor the formation of briquettes from said final product in order to eliminate dust pollution problems and reduce cost to a minimum.

It is an object of the instant invention to provide a method and apparatus that is capable of using fines of materials with no consequential carry-over nor the creation of fines from the product itself after metallization.

It is another object of the instant invention to provide a method and apparatus that is capable of desulfurizing the gas by the subjection of such gases through a bed of iron oxide of adequate depth before the gas leaves for the by-product plant.

It is further an object of the instant invention to efficiently reduce iron ore without using the principle of combustion, limiting the reaction of oxygen to the carbon and hydrogen of the coal.

It is further another object of the instant invention to provide a method and apparatus to eject the metallized product produced while it is hot into a vessel for liquification and desulfurization, and the deganguing taking place whilst the metallized iron is in a molten state for efficient chemical reactions with fluxing agents to result in a metallized molten material of high-quality suitable for charging directly into a steelmaking furnace.

It is yet an object of the instant invention to provide a method and apparatus that is capable of desulfurization of the metallized product prior to its ejection by the introduction of limestone or dolomite to be heated with ore and coal during the reduction process.

It is yet another object of the instant invention to provide a retort that is fully enclosed for the reduction of iron ore that possesses a plurality of compartments whose walls are made of an iron alloy such as heat and abrasion-resistant steel, said walls are heated by induction coils to guarantee uniform heating withing said retort and avoid localized heating which causes fusing and melting.

It is therefore, an object of the instant invention to provide a retort for reducing iron ore using the principle of induction heating, said retort being divided into compartments or cavities whose walls are made of alloy steel, which walls extend vertically substantially the entire height of said retort. Each of said compartments is insulated from each other thermally and magnetically in order to prevent heat from transfering from one compartment to another and also to guarantee that the walls of each compartment are heated uniformly. Further, each of said compartments is made to diverge downwardly to prevent material from bridging while descending in said retort.

It is, therefore, another object of the instant invention to support the entire columns of the material contained in each compartment of said retort on a water-cooled bed and the provision for removing or slicing metallized product from the bottom of said retort but above said bed by means of a ram moving transversely to the direction of the descent of the material within said retort to push the said material while hot into a vessel for liquification, desulfurization, and deganguing.

Other objects of this invention will appear from the following detailed description and appended claims, reference being made to the accompanying drawings forming a part of this specification wherein like reference characters designate corresponding parts in the several views.

BRIEF DESCRIPTION OF DRAWINGS

FIG. 4 is an elevational cross-section of the instant invention as used in conjunction with a basic oxygen steelmaking furnace. The mixer which receives the metallized iron is shown in its tapping position pouring molten metal into a ladle destined for use in the steelmaking furnace.

FIG. 5 is a partial elevational cross-section of the instant invention showing the mixer pouring slag into a pot for disposal.

FIG. 6 is a partial view showing an alternate method of introducing heat into the mixer and desulfurizing as compared to the employment of an induction coil.

FIG. 7 is a schematic drawing showing the employment of molten metallized iron in preparation for charging into an electric arc furnace.

FIG. 8 is a schematic view showing the principle of using a pigging machine to make pigs from the desulfurized and degangued metallized metal.

FIG. 9 is a schematic drawing showing an electric arc furnace equipped with means for using the pigs solidified in FIG. 7.

FIG. 10 is a cross-section of a retort showing the charging means, the duct work for gas removal, the compartments within the retort, the induction coils, the distribution means, the ejecting ram at the bottom of the compartments, the discharge chute, the flux chute, and the pollution control envelope for the evacuation of emissions.

FIG. 11 is a typical horizontal cross-section of each of the compartments for metallizing the iron.

FIG. 12 is a diagramatic representation of the by-product treatment facility showing the raw gas coming in and some of the gas returning to the boiler for power generation.

FIG. 13 is a diagramatic representation showing the generation of power from the gas to feed the induction coils for the generation of heat.

FIG. 14 is a view of an embodiment to collect particles from by-product gases leaving the retort before condensation.

FIG. 15 is an alternative embodiment of ejecting ram support.

Before explaining in detail the present invention, it is to be understood that the invention is not limited to the details of construction and the arrangement of the parts illustrated on the accompanying drawings since the invention is capable of other embodiments. Also, it is to be understood that the phraseology or terminology herein is for the purpose of description and not limitation.

DETAILED DESCRIPTION OF DRAWINGS

Figure 1:
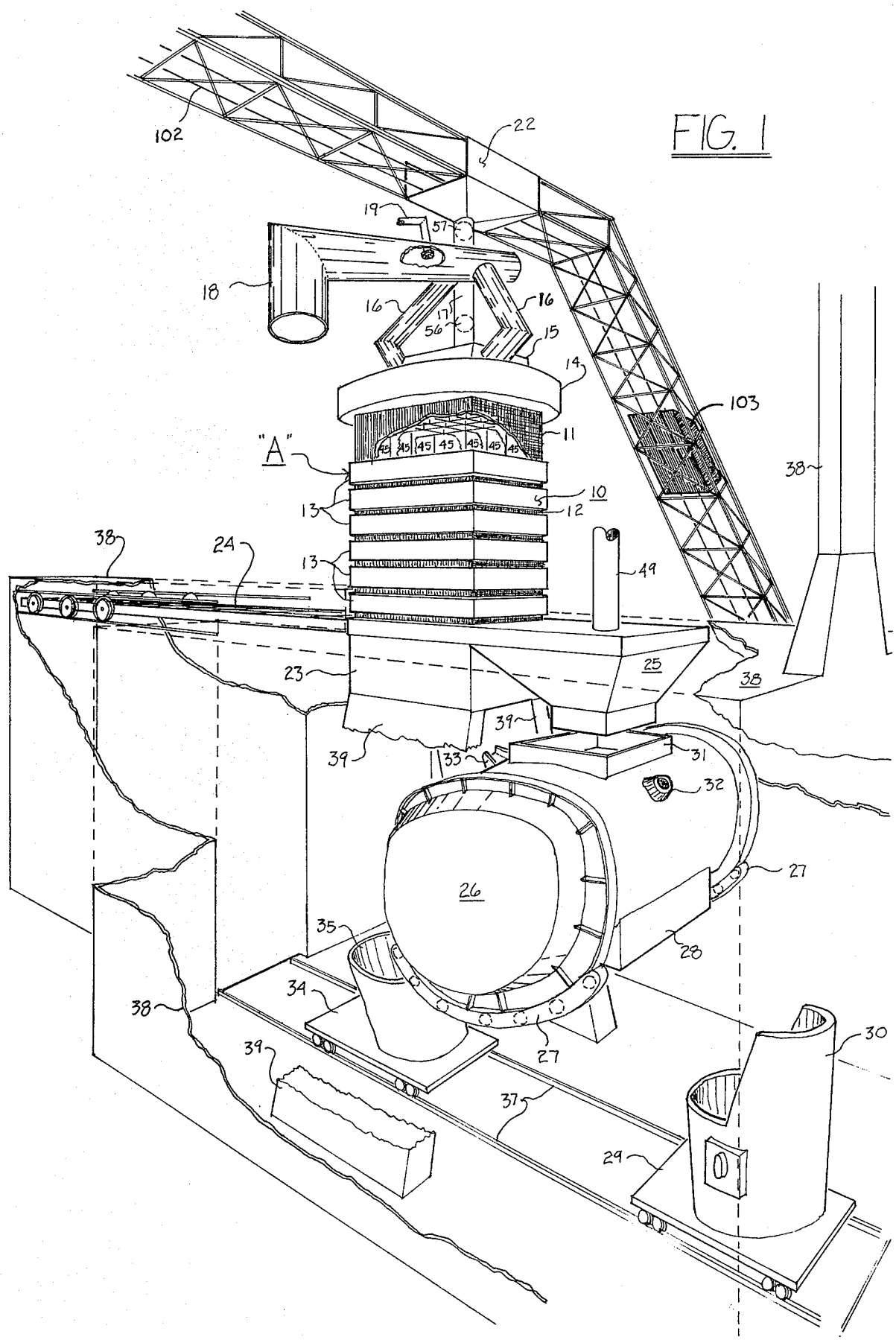
FIG. 1 is a pictorial schematic drawing of the instant invention. It shows a vertical retort or shaft equipped with a material-handling delivery system, a feeding means to introduce the charge material into the retort, a duct work for the removal of gases, a plurality of induction coils surrounding the retort above whick a distribution system of the materials is situated. Beneath the induction coils, an ejection system is provided to feed material into a chute. Beneath the chute, a mixer is shown to receive and contain the metallized iron. An induction coil to heat and to stir the metal is disposed to the bottom of the mixer. Transfer cars for iron and slag are also shown and the ejection means, chute, mixer and transfer cars are enveloped within an enclosure which is evacuated for the control of emissions.

FIG. 1, reference letter "A", represents the retort in which the reducing cycle takes place. Retort "A" possesses a shaft 10 which is divided into two parts—the preheating zone 11, and the heating zone 12. Roughly, and by way of example, the preheating zone is equal to about one-third ($\frac{1}{3}$) of the heating zone. Surrounding heating zone 12 is a plurality of induction coils 13. On top of shaft 10, distribution hopper 14 is situated. Above hopper 14, crown 15 is preferably flanged mounted for maintenance purposes. Duct work 16 and charging pipe 17 are installed in crown 15. Duct work 16 connect to gas main 18 with provision for flushing or quenching the gas by means of flushing system 19. Charging pipe 17 is provided with double valve 20 to insure no gas escapes during the charging of materials into hopper 14. Gas main 18 connects retort "A" to by-product plant 21 shown in FIG. 10. Material-handling system 22 supplies pre-mixed charging materials for the reduction operation. Beneath heating zone 12, supporting bed 23 is situated and to one side of said bed, ejecting means 24 is disposed. To the other side of supporting bed 23, discharge chute 25 is located. Beneath chute 25, vessel 26 is disposed. Vessel 26 preferably simulates a molten iron mixer and is adapted to revolve on rockers 27. At the bottom of mixer 26, induction coil 28 is preferably mounted between rockers 27. Also preferably, mixer 26 possesses an entry aperture 31 for receiving the metallized iron, a tap hole 32 for pouring the molten iron, and a slagging spout 33 disposed to mixer 26 opposite tap hole 31 for removing the ash, gangue, and slag.

Transfer car 29, equipped with hot-metal ladle 30, is disposed in such a way as to be within the pouring reach of mixer 26 in order to receive molten iron from it through tap hole 32. A second transfer 34, equipped with slag pot means 35, is suitably disposed for receiving slag from mixer 26 through spout 33. Fluxes are stored in hopper 36 and are added into mixer 26 through discharge pipe 49 which is situated above chute 25. Preferably, transfers 29 and 34 run on track 37 for movement towards and away from mixer 26. Envelope 38 encloses ram 24, bed 23, chute 25, mixer 26, transfers 29 and 34, and track 37 in order to provide a fully-enclosed system to control emissions. Envelope 38 is tied to a dust collection system (not shown) such as a bag house or precipitator.

Figure 2:
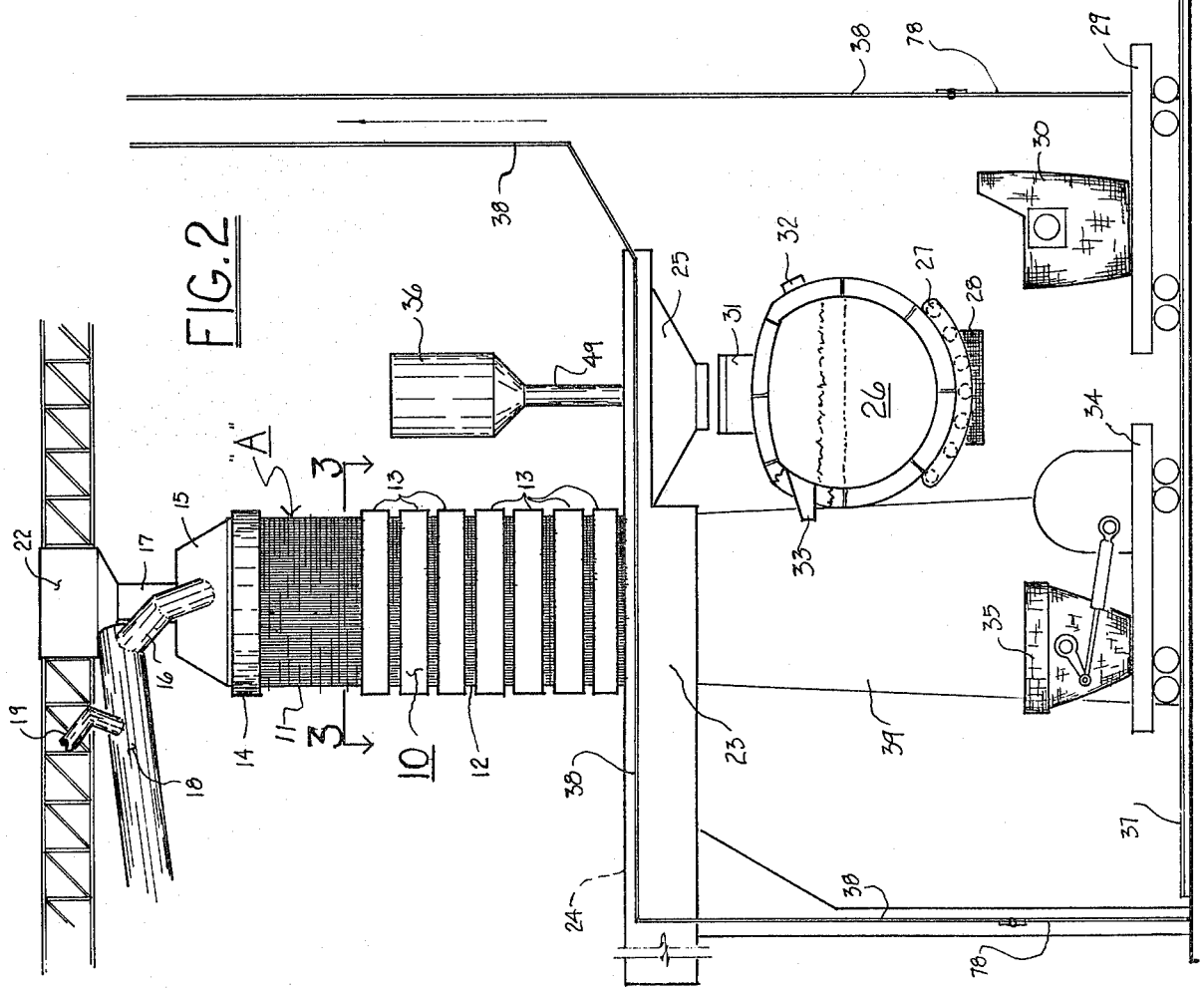
FIG. 2 is an elevational cross-section of the instant invention as used in conjunction with an oxygen steelmaking furnace. The mixer which receives the metallized iron is in the erect position.

Preferably retort "A" is erected on heavy foundations 39 and located in close proximity to a steelmaking furnace shop 40 as shown by FIGS. 2 and 4 which are equipped with Basic Oxygen Furnace 41. Crane 42 is used to charge the molten iron into furnace 41.

Mixer 26 may be provided with lances 43 and 44; 43 to blow oxygen into the metallized iron to liquify it and lance 44 to blow flux materials using nitrogen as carrier; this alternate way of liquification and desulfurization will replace induction coil 28, as shown in FIG. 5.

The molten iron made in retort "A" besides being suitable for use in Basic Oxygen Furnace 41, can also be used molten in conjunction with an Electric Arc Furnace such as furnace 50 shown in FIG. 7, the molten iron being charged by means of ladle 30. In cases where furnace 50 is remote from the location of retort "A", and it is impractical to deliver the iron molten, the molten iron from mixer 26 is passed through pigging machine 51, to make pigs 52 as shown in FIG. 8. Pigs 52 are shippped cold to the electric furnace shop containing furnace 50 where they are stored in hopper 53 and charged cold into furnace 50, this being shown in FIG. 9. Whether the iron made in retort "A" is charged hot or cold into an Electric Arc Furnace, it is still preferred to have it desulfurized and degangued, in order to make available to furnace 50 iron of high quality to compete with other change materials, such as scrap or pre-reduced ore in the form of pellets and briquettes.

DETAILED DESCRIPTION OF RETORT "A"

Retort "A" is made up of the following components: (i) Crown 15; (ii) Distribution hopper 14; (iii) Shaft 10; (iv) Induction coils 13; (v) Supporting bed 23; (vi) Ejection means 24; (vii) Delivery chute 25; and (viii) Sealed enclosure 38. FIG. 10, which is a vertical section through retort "A", shows the components enumerated above.

Crown 15—Crown 15 forms the top of retort "A". Material handling system 22 delivers the pre-mixed charge into retort "A" through crown 15; delivery pipe 17 which is part of system 22, is equipped with double closure valves 56 and 57, to prevent gas escaping from crown 15 during charging. The raw gases generated within the retort are removed from crown 15 and directed to the by-product plant by overhead ductwork 18, which by-product plant is schematically shown in FIG. 12. Crown 15 is preferably lined with brick work to minimize heat losses and to maintain the temperature of the raw gas above the condensation point of the tars to prevent their deposit within crown 15. Crown 15 contains a volume big enough to decelerate the gases leaving the charge in order to minimize the carry-over of particulates. The embodiment shown by FIG. 14 is a structure that may be added downstream of crown 15 to remove particulates from the gas prior to its being quenched. The gas is passed through box 58 which is equipped with baffle 59 to change the direction of the gas and slow it down. Box 57 may also be equipped with heaters 60 to insure that the gases stay hot to prevent tar condensation. It is preferred to keep the gases leaving the charge to around 1,000° F. and without substantially increasing this temperature in order to prevent the cracking of the methane contained in the gas. The cracking of the methane is detrimental not only because of the energy value of the methane, but also because carbon deposit takes place during such cracking.

Distribution Hopper 14—Distribution hopper 14 is located beneath crown 15 and is equipped with distributing paddle means 54, which is adapted to revolve about shaft 61, whilst drive 55 is provided for activating means 54. Drive 55 is located exteriorly of crown 15.

Distribution hopper 14 is also lined to prevent heat losses. Both crown 15 and distribution hopper 14 may be heated by induction or otherwise.

Figure 3:
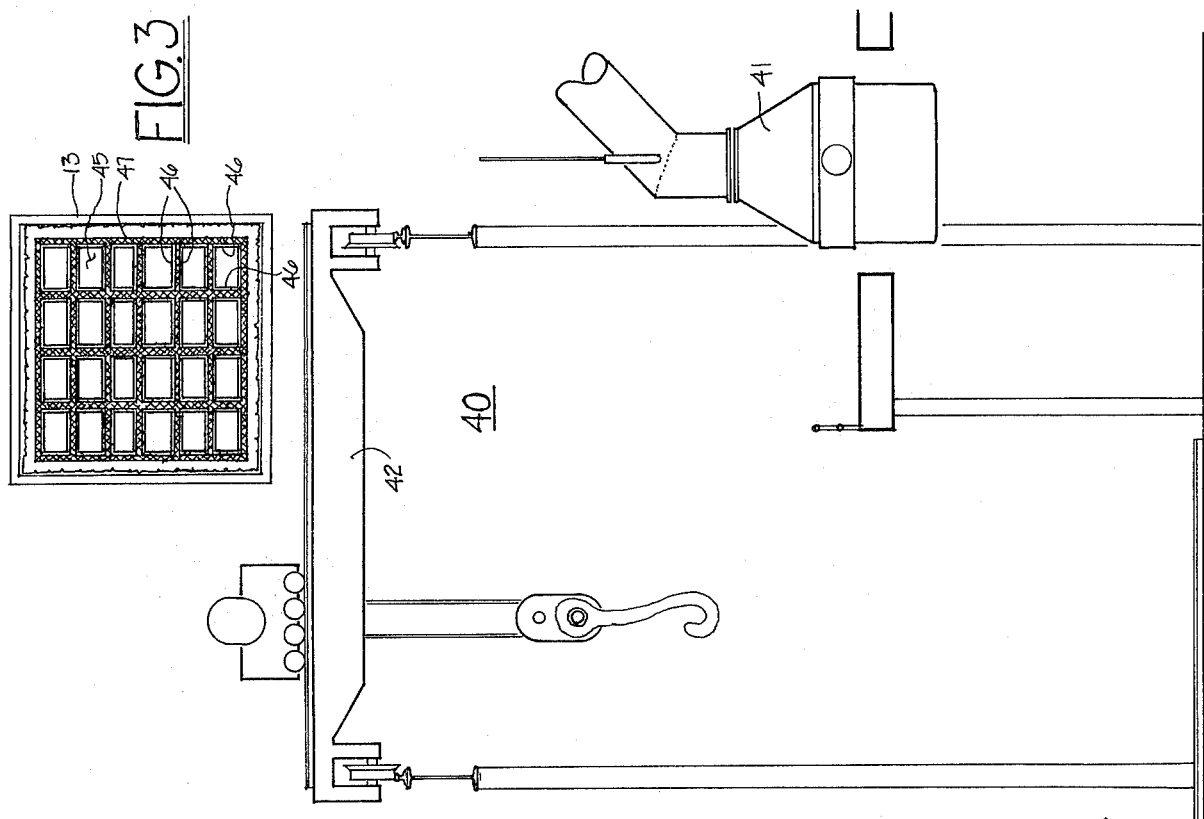
FIG. 3 is a view at Section 3—3 of FIG. 2.

Shaft 10—Shaft 10 which is divided into pre-heating zone 11 and heating zone 12 is internally made up of a plurality of compartments such as compartment 45 and preferably these compartments extend the total height of shaft 10. It is preferred to have the arrangement shown by FIG. 3. Each compartment 45 is insulated by means of insulating material 47 from its adjacent compartment as shown by FIG. 11. Compartment 45 is made up of walls 46 to form a cluster of cavities. Walls 46 are made of heat and abrasion-resistant steel or an alloy of iron which walls are heated by induction and in this manner guarantee proper and controlled heating throughout shaft 10. Gas pipes 102 made of a material not affected by induction heating, may be disposed between walls 46 to introduce gas into compartments 45. To prevent material from bridging, walls 46 are preferably made to diverge downwardly so that the dimensions at the bottom of each compartment are greater at the bottom than at the top. Compartments 45 are tied together structurally at the bottom and are free to expand vertically when heated. A refractory material 48 is disposed outside the entire shaft as an envelope to minimize heat losses.

Induction Coils 13—Heating zone 12 of shaft 10 may comprise about two-thirds to three-fourths of shaft 10. Surrounding heating zone 12, a plurality of induction coils 13 are disposed in such a way as to provide controlled heating by induction of walls 46 of compartments 45. Walls 46 are uniformly heated and each area encompassed by each coil 13 is selectively controlled for a specific energy input to give the maximum efficiency in driving the volatiles from the coal and in making possible the reactions with the oxygen of the ore and provide the most efficient method of metallizing the ore to iron without fusion or melting of the iron. The rated energy delivered to walls 64 of each compartment through induction coils 13 is such that metallurization of the ore generally begins at the walls at the top of heating zone 12 and proceeds downwardly in such a manner as to substantially metallize the iron ore to about ninety to ninety-three percent (90% to 93%) by the time the charge material reaches the bottom of compartment 45. At the bottom of compartments 45, bulkheads 62 are provided to span across each row of compartments 45 within shaft 10, which bulkheads possess water passages 61 for cooling. Carbide blade 64 is mounted against bulkhead 61 and located opposite the direction of discharge of the metallized iron. Blades 64 serve as a plurality of cutters to facilitate the separation of the metallized iron being pushed out of shaft 10 from the rest of the burden contained in compartments 45. In the event that there is a melt-down of certain low temperature tramp elements which may be contained in the ore, cooling bed 23 whose detailed description follows, re-solidifies these materials prior to discharge from shaft 10. As the degree of metallization increases downwardly in shaft 10, a secondary effect of direct induction into the charge takes place; this phenomena adds to the efficiency of metallization, reduces power requirements, and accelerates cycle time.

Support Bed 23—Beneath compartments 45 support bed 23 is located. Bed 23 supports the total weight of the charge contained in shaft 10. This charge may weigh in excess of 1,000 tons. Bed 23 is in turn supported on piers 39 which are made of stout re-enforced concrete structures of massive dimensions to stand the heavy loads of the charge, shaft 10, etc. Bed 39 is made of a top wear plate 65 supported on a water cooled crib 66.

Ejection Means 24—In order to remove the metallized material from the bottom of shaft 10, ejection means 24 is provided. It comprises ram 67 mounted on track wheels 68 with a gear rack 69 disposed to it. Rack 69 engages pinion gear 70 which is driven by a drive means 71. Track wheels 68 are guided by rails 72 in order to keep ram 67 in alinement while ejecting the metallized material from the bottom of shaft 10. Head 73 of ram 67 is equipped with frontal carbide blade 74. The pushing of blade 74 by means of ram 67 towards blades 64 which are mounted to bulkheads 62 at the bottom of compartments 45, cause the shearing action to the metallized material in order to sever or slice the material located below the bottom of compartments 45 from the material located above bulkheads 62. An alternate embodiment of supporting the head of ram 67 is to support the frontal end of ram 67 on iron spheres 75 as shown by FIGS. 15a and 15b. Spheres 75 are contained in "V" grooves 76 and provide support to ram 67 during the ejection portion of the cycle, during which time the part of ram 67 which is inside shaft 10 supports the entire burden of the charge contained in shaft 10. Grooves 76 are preferably lined with wear-resistant plates 77 and are water-cooled.

Delivery Chute 25—Between retort "A" and mixer 26 delivery chute 25 is situated. This chute directs the metallized material from shaft 10 to mixer 26 while the material is hot between 1500° F. to 1800° F. The flux is fed from hopper 36 to mixer 26 through delivery chute 25.

Sealed Enclosure 38—In order to control emissions an envelope in the form of enclosure 38 encloses the complete portion of retort "A" which is below coils 13 and the ground, so that bed 23, ejection means 24, delivery chute 25, and transfers 29 and 34 are completely contained within sealed enclosure 38 to control all emissions during the various steps of the operation. Sealed enclosure 38 is tied to a bag-house, a precipitator or a scrubber. Gates 78 are provided to enclosure 38 for the egress and ingress of transfers 29 and 34.

Referring to FIG. 12, the raw gases leaving retort "A" by means of main duct 18 is flushed with liquor to condense the tar in system "B" and the gas produced passes through cooler 79, exhauster 80, precipitator 81, reheater 82 and thence directed to saturator 83. Ammonia still 84 is tied to tar decanter 85. The gas leaving saturator 83 is cooled in 86, scrubbed in 87 and is in condition for usage such as make steam for power generation while the excess stored in gas holder 88, or delivered to other facilities for use.

Referring to FIG. 13, some of the gas is directed by means of pipe 89 to combustion chamber 90 of boiler "C" in order to make steam needed for the power generation for induction coils 13 and for other power needs. Boiler "C" is made up of combustion chamber 90, steam drum 91, water drum 92 and economizer 93. Venturi scrubber 44, tied to demister 95, scrubs the spent gases before being ejected. Downstream from demister 95, fan 96 is situated. Steam accumulator 97 is tied to steam drum 91. Accumulator 97 is in turn tied to turbine 98, and turbine 98 is tied to electric generator 99 by means of coupling 100. Turbine 98 possesses condenser 101. Generate 99 generates the power requirement to operate induction coils 13. As will be shown later in this specification, the amount of gas generated far exceeds the needs to operate induction coils 13, and the method and apparatus of the instant invention is a positive energy producer as well as an efficient gasifier.

Operation

While the operation of the apparatus of the present invention may be comprehended from a study of the foregoing description, it is believed that the operation of this apparatus and the method itself should be explained, as hereinafter set forth.

Assuming that the apparatus has been initiated and the process is already operating. An appropriate charge of selected grades of coal and ore, and preferably cheap coal and low-grade ore, are thoroughly mixed outside retort "A". Limestone or dolomite may be added to the coal and ore. They are next delivered to the top of retort "A" by delivery means such as conveyor 102 or skip hoist 103, and they are charged into the top of retort "A" through pipe 17. The control of the charge material into the retort is effected by valves 56 and 57 to create a smokeless charging system. The charge material leaving pipe 17 drops through crown 15 and into distribution hopper 14. Paddle means 54, which is in constant rotation, distributes the charge material into the top of compartments 45. The level of material in distribution hopper 14 is maintained at such an elevation as to guarantee the continuous supply of material into compartments 45. The initial heating of the material takes place in pre-heating zone 11 to drive the moisture from the charge material and also initiate some reduction. The charge materials contained in compartments 45 keep descending while metallized material is ejected from the bottom of shaft 10, and upon entering heating zone 12, the charge materials are effectively heated by the steel or iron walls 46 of compartments 45. Initially, that material which is contiguous to walls 46 is heated first because of contact with the red-hot walls 46 which possess a temperature range of about 1,800° F. to 1,900° F. The coal, upon being heated at walls 46, gives up volatiles in the form of complex gases containing mainly carbon and hydrogen which both react with oxygen of the ore to reduce that ore which is also hot because of its being contiguous to the red-hot walls 46. The reaction of the carbon and hydrogen with the oxygen of the ore is exothermic and, therefore, the release of heat takes place, which heat in turn heats more coal and ore that is contiguous to that which had reacted and in turn again, the release of more volatiles from the coal takes place causing additional reaction between the carbon from the volatiles and oxygen of the ore and; consequently, still more heat is released which heat keeps the process going on and on as long as heated walls 46 keep supplying the additional energy required to supplement the energy needed for the total reaction. To enhance the reaction, it is preferred to operate retort "A" with a positive pressure.

Since the burden, made up of coal and ore and possibly stone, is not a good conductor of heat, and since the reactions in retort 10 in totality are endothermic, the heat supplied by walls 46 which are in turn heated by coils 13, make up the difference of the energy to complete the reaction. From an energy efficiency standpoint, retort "A" is of the highest degree. This is so because the heat is confined in each compartment 45, the pre-heat in the upper portion is most efficient, the exothermic reaction from the oxidation of the hydrogen and the carbon results in the generation of additionl heat, and the direct induction taking place through the charge material once it metallizes. This is clearly shown in FIGS. 10 and 11. The materials in heating zone 12 are heated in the range of 1,300° F. to 1,800° F. to guarantee that all the volatiles are driven from the coal, and in this manner, a temperature of high enough elevation is made available to guarantee the reaction of the carbon with the oxygen of the iron. An excess of coal is purposely charged into retort "A" to guarantee the availability of carbon to make the reactions possible and keep the atmosphere within shaft 10 reductive. The gases which are released are complex and are made up mainly of hydrogen and carbon at the temperatures provided. The hydrogen reaction with oxygen of the ore to reduce it creates water; at the temperatures provided, the water disassociates immediately forming more gas such as methane and CO. The carbon in the gas reacts with the oxygen of the ore to make more CO. All of the hot gases rise from the heating zone and pass through the charge materials reaching the top of shaft 10. This effectively pre-heats the charge before entering heating zone 12. It is imperative to keep the top of retort "A" above the level of materials charged to such a temperature as to prevent the condensation of the tars and the prevention of the cracking of the methane. This temperature preferably ranges from 700° F. to 1,000° F. It is also important to keep the velocity of the gases to a minimum and preferably operate crown 10 under a positive pressure to result in effective gas distribution within pre-heat zone 11 and also to keep the carry-over of fines to a minimum. All the gases leaving preheat zone 11 are captured at the top of retort "A", piped out of retort "A", quenched, and directed to the by-product plant shown in FIG. 12.

By way of example, the holding capacity of retort "A" for one million tons of production per year is about 1,400 tons of charge materials. 180 tons of material are discharged from retort "A" every hour in increments of 30 tons every ten (10) minutes. The height of shaft 10 is such that when the material reaches the bottom of compartments 45, the iron ore is metallized to about 90 to 93 percent metallization.

The metallized material is ejected from the bottom of shaft 10 by means of ram 67 while the material is hot, preferably about 1,800° F., and it is severed or sliced from the balance of the material located above discharge means 24. The material is fed directly into mixer 26. The capacity of mixer 26 is around 800 tons; therefore, the 30 tons of metallized material is charged into a large pool of molten iron which is super-heated to about 2,550° F. This super heat, which is preferably generated by induction coil 28 which is situated at the bottom of mixer 26, liquifies the metallized metal same as an ice cube being dropped into a pitcher of piping hot tea; the ice cube melts rapidly in the tea. A stirring action is also induced by coil 28 to give an effective mixing action.

In addition to the melting of the hot metallized material discharged into mixer 26, fluxes are added from hopper 36 to desulfurize the iron. Periodically, such as once per hour, molten iron is tapped from mixer 26 into ladle 30 through tap hole 32 with a minimum discharge of gangue, ash, or slag into ladle 30. The de-slagging and de-ganguing is accomplished by rotating mixer 26 is the opposite direction of the tap to remove the slag through spout 33. In following this procedure, high-quality iron, fully-desulfured and having a uniform temperature and analysis, is delivered to basic oxygen furnace 41 or electric furnace 50. With this kind of hot metal delivery, the maximum efficiency of the steelmaking furnaces will be realized. It is to be noted that the metallized iron ejected from retort "A" preferably contains about 4.5 to 5 percent carbon in order to be comparable to molten iron from a blast furnace; such carbon content makes possible the use of oxygen in electric furnace 50 which in turn will contribute to an appreciable reduction in electric power consumption.

The location of retort 10 in relation to the steelmaking furnaces is of great importance. If the location of this facility is distant from the steelmaking furnaces, it is conceivable to use submarine ladles instead of open ladles, which open ladles are shown in the drawings herein.

If the steelmaking furnace is so remote from retort "A" as to make impractical the delivery of molten iron, it is then solidified into pigs of manageable size and are charged cold into said furnace. Generally, this will be the case in using cold pigs in conjunction with the electric furnace.

Since iron ore is a good sulfur remover, pre-heat zone 11 of shaft 10, is made of such height as to expose the gases rising in shaft 10, to the iron ore in a way as to have the iron ore serve as a filter to the gases. In so doing, the gases leaving the retort are desulfurized in a very effective manner. By desulfurizing the gas by the iron ore in the charge, and possibly by limestone added to the charge, and by removing the sulfur with fluxes such as with lime, magnesium, and soda in the mixer after the melt down of the metallized material, the use of high sulfur coals can substitute the expensive metallurgical coking coals now in use. Further, melting the metallized material obviates the necessity of using crushing and magnetic separation of metallized material as proposed in the patent issued to Beggs, referred to above. Crushing and magnetic separation is not the most efficient method of separating the iron units from gangue.

Instant Invention is a Positive Energy Producer

Chemical reaction in retort "A" in simplified form:

$Fe_2O_3$(160 lbs.)+3C(36 lbs.)=2Fe+3CO

Weight of ore needed for a ton of metallized iron, 93% pure Fe from 30% Fe ore is:
2,000×93%)/30%=6,200 lbs.

Theoretical weight of coke required for reducing reaction:
(6,200 lbs.×36)/160=1,395 lbs.

Weight of coal required to make 1,395 lbs. of coke;
(1,395×100%)/66%=2,114 lbs.

Weight requirement for reduction (2,114 lbs.) and weight requirement for refining (5% additional carbon) is:
2,114 lbs.+(, 5%×2,114) 106 lbs.=2,220 lbs.

Excess coal charged to guarantee reaction is 20%; weight of coal to make one ton of metallized iron:
2,220 lbs.×120%=2,664 lbs.

Total weight of charge per ton of metallized iron made in exclusion of stone for fluxing is:
6,200 lbs. (ore)+2,664 lbs. (coal)=8,864 lbs.

Since one (1) ton of charge requires 666 KW-HRS. for power, power requirement for 8,864 lbs. is:
(666 KW-HRS.×8,864)/2,000=2,952 KW-HRS.

Energy recovery and heat transfer in pre-heat zone from rising gases amounts to 25% absorption of the energy input.

Net power consumption is:
2,952 KW HRS.×75%=2,214 KW HRS.

The conversion from KW HRS. to BTU's (using the constant of 1,000 BTU's to 0.3 KW HR.) is:
(2,214×1,000)/0.3=7,380,000 BTU.

Efficiency of BTU conversion to electric power in the power plant is 32%, actual BTU expended to generate 2,214 KW HRS. is:
(7,380,000×100)/32=23,062,000 BTU Heat Energy Credits (a) Heat Energy from Heat of Reaction Energy release by chemical reaction when 1 lb. of Carbon (C) is converted to Carbon Monoxide (CO) in the equation of $C+\frac{1}{2}O_2=CO+4,200$ BTU/lb. For 1,395 lbs. of Coke, the energy release is:
1,395 lbs.×4,200 BTU=5,859,000 BTU (b) Heat Value of New Gas Produced In the reaction of ore ($Fe_2O_3$) with the Carbon (C) of the coal, the great quantities of Carbon Monoxide (CO) generated make up the bulk of energy produced, and renders the instant invention a positive energy producer. This is shown as follows:

In the equation:
$Fe_2O_3+3C=2Fe+3CO$
160 lbs.+36 lbs.=112 lbs.+84 lbs.

Therefore, the number of pounds of CO that is generated from 160 lbs. of Ore ($Fe_2O_3$) is 84 lbs.

84 lbs. in percent represents:
(84×100)/160=52.5%

As shown, the ore charge is 6,200 lbs. for every ton of metallized iron made, to contain 93% Fe; therefore, the number of pounds of CO that are generated with 6,200 lbs. of 30% Fe ore is:
6,200 lbs.×52.5%=3,255 lbs.

1 lb. of CO has a heat value of 9,800 BTU; therefore, the heat value of the CO gas generated per ton of metallized iron made from low-grade ore is:
3,255×9,800 BTU=31,899,000 BTU The gross gain in energy is:
5,859,000+31,899,000=37,758,000 BTU The net gain in energy per ton of metallized iron is:
37,758,000−23,062,000=14,696,000 or roughly 15 million BTU One barrel of oil has the equivalent of about 6 million BTU.

Energy savings per ton in barrels of oil equivalent is:
15 mil. BTU÷6 mil. BTU=2.5 barrels.

The iron production in the United States is 100 million tons per year, the energy savings per year in barrel equivalents is:
1,000,000 tons×2.5 barrels=250,000,000 barrels.

At a cost of $25.00 per barrel (1980 price), the net saving in energy is 1980 dollars per year is:
250,000,000×$25.00=$6.2 billion dollars From the foregoing detailed description of the disclosure, it is evident that the instant invention is a contribution of great significance to the art of ironmaking, to the production of energy, to the controls of emissions, to the elimination of health hazards to the workers, to the improvement in our balance of payments, to the employment of domestic abundant raw materials, to the conservation of capital, and to the prevention of the social deterioration of the steel districts. In fact, the instant invention is of such significance when analyzed strictly from an energy producing source, that it can also be said that this invention produces energy as its main product and iron as a by-product. All in all, it is submitted that the present invention provides a new and useful method and apparatus for the making of iron, and significant quantities of energy on which our industrial country depends.

I claim:

1. A method of reducing iron oxide comprising the steps of charging iron oxide and solid carbonaceous material into a plurality of compartments each of which comprises a tubular wall formed of a material which is adaptable to being heated by induction and defining a reducing space therein, said plurality of compartments commonly sharing an induction coil means which surrounds the tubular walls of said plurality of compartments and said induction coil means does not individually surround the tubular wall of any of said compartments, heating said tubular walls of said plurality of said compartments by said induction coil means and transferring heat by conduction from the tubular walls to the iron oxide and solid carbonaceous material therein to cause the metallization of the iron oxide by reaction of the iron oxide with the reducing agents that are released from the solid carbonaceous material upon the heating thereof within each compartment, and discharging metallized iron from said plurality of compartments.

2. The method as set forth in claim 1 wherein said step of heating said tubular walls of said plurality of compartments by said induction coil means is further characterized by the step of providing insulation to insulate said plurality of compartments in such a way as to have the tubular wall of each compartment isolated from the tubular walls of adjacent compartments.

3. The method as set forth in claim 2 wherein said step of insulating said plurality of compartment is further characterized by the step of providing insulation to thermally insulate the tubular walls of said plurality of compartments from each other to minimize heat loss from each compartment in order to efficiently drive the heat from the tubular wall of each compartment to the contents contained within each compartment.

4. The method as set forth in claim 2 wherein said step of insulating said plurality of compartments is further characterized by the step of providing insulation to electrically insulate the tubular walls of said plurality of compartments from each other to minimize short circuiting of the magnetic flux from one compartment to an adjacent compartment in order to uniformly heat the tubular walls of said compartments.

5. The method as set forth in claim 1 wherein the tubular wall of each compartment is located outside the confines of the tubular walls of the other compartments.

6. The method as set forth in claim 1 wherein said step of charging iron oxide and a carbonaceous material into said plurality of compartments is further characterized by the step of distributing the charge into said plurality of compartments in such a way as to have substantially the same amount of iron oxide and carbonaceous material delivered to each compartment of said plurality of compartments.

7. The method as set forth in claim 6 wherein said step of charging iron oxide and a carbonaceous material into said plurality of compartments is further characterized by the step of adding a flux agent to the charge.

8. The method as set forth in claim 1 wherein said step of discharging metallized iron from said plurality of compartments is further characterized by the step of melting the discharged metallized iron to produce an iron which is suitable for charging into a steel making furnace.

9. The method as set forth in claim 1 wherein said step of heating said walls of said plurality of compartments by said induction coil means to cause the metallization of the iron oxide by the reducing agents contained in the carbonaceous material is further characterized by the step of collecting the gaseous products resulting from such metallization.

10. The method as set forth in claim 9 wherein the step of collecting the gaseous products resulting from metallization is further characterized by the step of employing at least some of said gaseous products for drying and preheating the charge.

11. The method as set forth in claim 10 wherein the step of employing at least some of said gaseous products for drying and preheating the charge is further characterized by the step of drying and preheating the charge to desulfurize said gaseous products.

12. The method as set forth in claim 10 further characterized by the step of using said gaseous products as a fuel for the production of electric power.

13. The method as set forth in claim 9 further characterized by the step of positively introducing at least a portion of said gaseous products into said plurality of compartments.

14. The method as set forth in claim 1 including the steps of semi-continuously charging iron oxide and carbonaceous material and discharging metallized iron.

15. The method as set forth in claim 1 including the steps of continuously charging iron oxide and a carbonaceous material and discharging metallized iron.

16. The method as set forth in claim 1 wherein the step of heating said walls of said plurality of compartments by said induction coil means to cause the metallization of the iron oxide by the reducing agents contained in said carbonaceous material is further characterized by the step of subjecting the contents of said compartments to a divergent downward feed to minimize bridging of the material during its descent in said compartments.

17. The method as set forth in claim 1 wherein said plurality of compartments extend generally vertically, and wherein the step of heating the walls of said plurality of compartments by said induction coil means is further characterized by the step of heating said compartments in the vertical direction in zones to result in an efficient and controllable mode of heating.

18. The method as set forth in claim 1 wherein the step of heating the walls of said plurality of compartments by said induction coil means is further characterized by the step of subjecting the charge to a positive pressure.

19. The method as set forth in claim 1 wherein the step of discharging metallized iron from said plurality of compartments is further characterized by directing the hot metallized iron, with the gangue and ash contained therein, into a mixing vessel, and heating the discharged metallized iron, gangue and ash so as to melt the discharged metallized iron with the gangue and ash to place those materials in condition for efficient desulfurization.

20. The method as set forth in claim 19 wherein the step of directing the hot metallized iron with the gangue and ash into a mixing vessel is further characterized by the step of charging fluxes into said mixing vessel to form a slag and desulfurize the iron.

21. The method as set forth in claim 20 wherein the step of charging fluxes into said mixing vessel to form slag is further characterized by the step of stirring the contents of said mixing vessel for efficient desulfurization and separation of the molten iron from said slag.

22. The method as set forth in claim 20 wherein the step of charging fluxes into said mixing vessel to form a slag and desulfurize the iron is further characterized by the step of tapping the iron from said mixing vessel and charging it into a steel making furnace.

23. The method as set forth in claim 20 wherein the step of charging fluxes into said mixing vessel to form a slag and desulfurize the iron is further characterized by the step of tapping the iron from said mixing vessel and casting such iron into pigs.

24. The method as set forth in claim 19 wherein the step of directing the metallized iron into a mixing vessel to melt the discharged metallized iron is further characterized by the step of blowing oxygen into said mixing vessel to cause the oxidation of some of the carbon accompanying said metallized iron to cause the generation of heat and cause the liquification of the materials within said mixing vessel.

25. The method as set forth in claim 19 wherein the step of directing the metallized iron with the gangue and ash into a mixing vessel which is equipped with heating means to melt the discharged metallized iron with the gangue and ash is further characterized by the step of employing induction heating to cause the melting of the metallized iron with the gangue and ash.

26. The method as set forth in claim 25 wherein the step of employing induction heating to cause the melting of the metallized iron with the gangue and ash is further characterized by the step of producing a mixing action with said induction heating to produce a molten metal of consistent analysis and temperature.

27. The method as set forth in claim 1 wherein the step of discharging metallized iron from said plurality of compartments is further characterized by the step of charging such metallized iron into a steelmaking furnace.

28. The method as set forth in claim 1 wherein the step of discharging metallized iron from said plurality of compartments is further characterized by the step of removing controlled amounts of metallized iron from said plurality of compartments.

* * * * *